Figure 1:
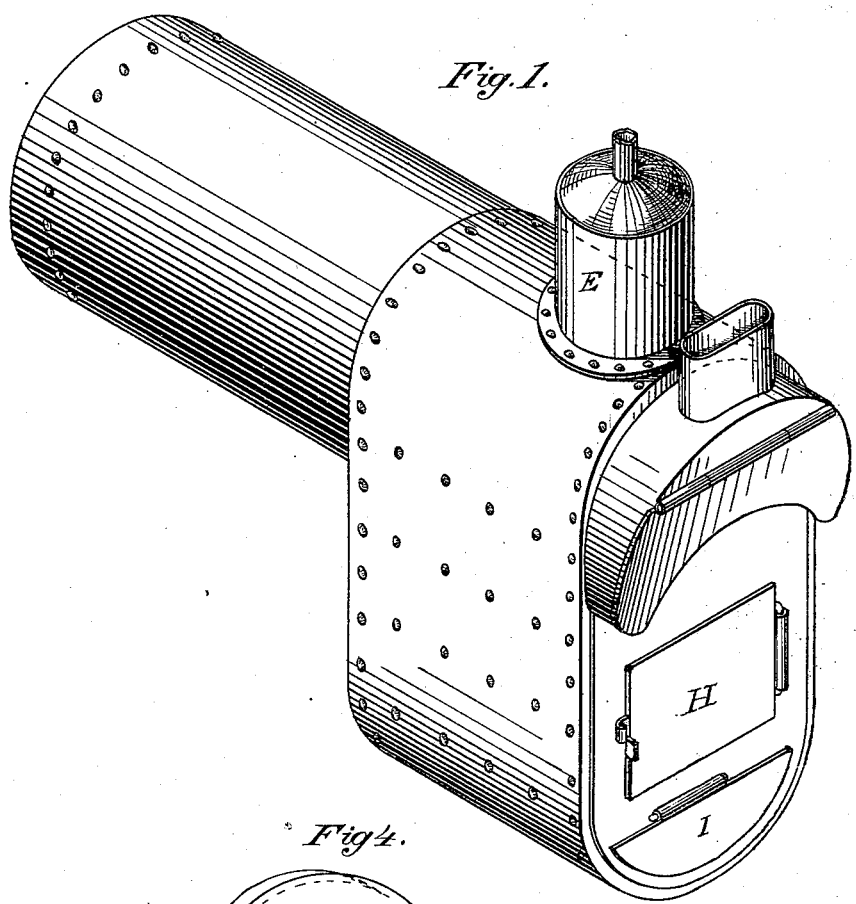

2 Sheets—Sheet 1.

C. E. BARBER & G. A. PORTER.
STEAM-BOILER.

No. 192,481. Patented June 26, 1877.

Attest:
F. H. Schott.
M. Tunispk

Inventor:
Chas. E. Barber
Geo. A. Porter
By D. J. Abbott
Atty.

N. PETERS, PHOTO-LITHOGRAPHER, WASHINGTON, D. C.

2 Sheets—Sheet 2.

C. E. BARBER & G. A. PORTER.
STEAM-BOILER.

No. 192,481. Patented June 26, 1877.

Attest:
F. H. Schott
M. Ten Eyck

Inventor:
Chas. E. Barber
Geo. A. Porter
By D. J. Abbott
Atty.

UNITED STATES PATENT OFFICE.

CHARLES E. BARBER AND GEORGE A. PORTER, OF SYRACUSE, ASSIGNORS TO PORTER MANUFACTURING COMPANY, (LIMITED,) OF SAME PLACE, AND WHITMAN & BURRELL, OF LITTLE FALLS, NEW YORK.

IMPROVEMENT IN STEAM-BOILERS.

Specification forming part of Letters Patent No. 192,481, dated June 26, 1877; application filed February 8, 1877.

*To all whom it may concern:*

Be it known that we, CHARLES E. BARBER and GEORGE A. PORTER, of Syracuse, in the county of Onondaga and State of New York, have invented certain new and useful Improvements in Steam-Boilers; and we do hereby declare that the following is a full, clear, and exact description thereof, which will enable others skilled in the art to which it appertains to make and use the same, reference being had to the accompanying drawings, and to the letters of reference marked thereon, which form a part of this specification.

This invention relates to that class of boilers used for the purpose of supplying steam to engines, either portable or stationary, which are in general use for agricultural and other purposes where a great amount of power is not required. As these boilers are frequently placed in charge of inexperienced persons, and are used with all kinds of water and fuel, it becomes imperative that they should possess qualities not needed by those in use upon steamboats, railways, or other places where proper care is taken of them—among these several requisites which it has heretofore been found very difficult to combine—viz., lightness, so that it may be moved easily from place to place, and great strength, containing a small quantity of water at a time, but still covering the crown-sheet to a good depth, a fire-box within the boiler, and, with all the rest, good steaming qualities.

The object of this invention is, therefore, to so unite the old and well-known devices heretofore known in boilers applied to other uses with certain novel features in such a manner as to produce a boiler possessing great strength from a minimum quantity of material, and which shall have a large amount of grate and fire surface in proportion to its size, with a small quantity of water, but with the parts so arranged as to keep a large proportion of that water above the crown-sheet, thus avoiding the danger arising from inattention to the water-supply, the whole boiler being of such shape as to allow it to be mounted upon wheels with facility, for transportation from place to place; and the invention consists in the construction and arrangement of the different parts, as will be hereinafter fully set forth, and then specifically pointed out in the claims.

Figure 4:
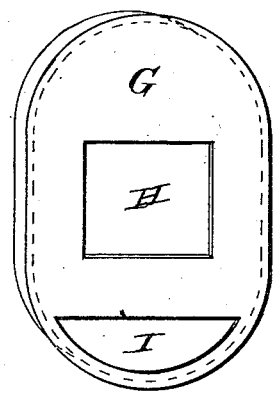
Figure 2:
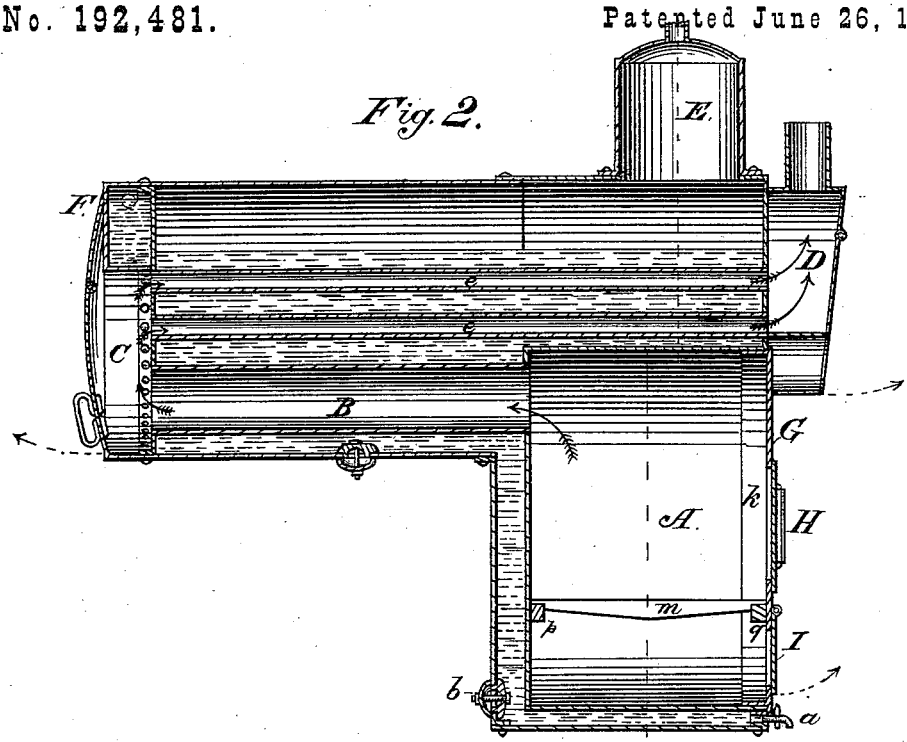
Figure 3:
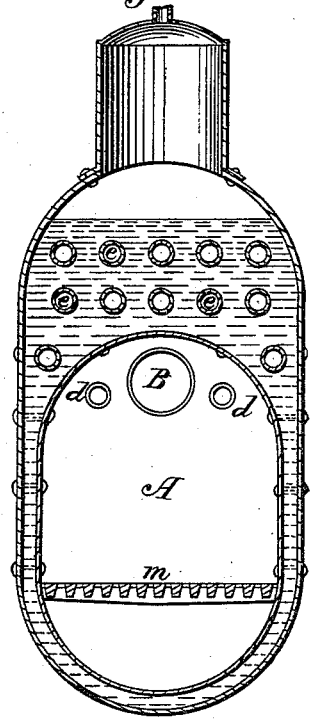

Figure 1 of the drawings is a perspective view of the boiler complete. Fig. 2 represents a vertical longitudinal section of the boiler, and shows the relative arrangement of the different devices composing its structure. Fig. 3 is a vertical cross-section through the fire-box and water and steam space above it on the line $x\,x$ of Fig. 2. Fig. 4 represents the front plate removed, showing its construction.

In the drawings, A represents the fire-box, constructed in a form somewhat similar to that of the ordinary locomotive-boiler, but with these points of difference: while that is open below, this has a circular water-bottom, in which the water is quiet and comparatively cool, as the heat does not directly strike upon it, owing to its tendency to ascend, and the fact that the part below the grate is generally covered with a layer of ashes of greater or less thickness, thus affording a place for the subsidence and deposit of all earthy matters which the water used in the boiler may contain, and from which it is easily removed through the blow-off cock $a$ inserted in the lowest part of the water-bottom, or by the hand-hole $b$ in the rear of the fire-box. Ample water-space is given between the outer and inner shells of the fire-box, and especially so in the back part, to prevent the ascending current caused by the formation of steam in the rear of the back plate becoming so strong as to stop the descent of such matters as may be held in suspension by the water.

It will be observed that the grate $m$ is placed very low, so as to give ample space above it for the fuel and a large combustion-chamber, without danger of blocking the flue B or the side tubes $d$, by which the combustion-chamber of the fire-box is connected with the smoke-returning chamber C at the rear of the boiler.

In fact, this flue B actually forms an extension of the combustion-chamber, carrying the products of combustion to the rear of the boiler with but slight loss of heat as compared with a series of tubes, thus enabling the returning-tubes e, which connect the chamber C with the smoke-bonnet D, to perform their share of duty as a steam-producing surface, which is not the case in boilers where the flame and gases are made to pass from the fire-box to the returning-chamber through a system of small tubes, which are found to deaden and prevent the complete mingling of the gases produced with the large quantity of oxygen so necessary to a perfect combustion. These tubes e, in their course from the returning-chamber to the smoke-bonnet, pass over the flue B and the crown-sheet of the fire-box, and may be in one or more horizontal rows, according to the size of the boiler in which they are placed; but, whatever may be their number and location, the water-level is always carried above them, and as near the top of the boiler as is consistent with the required space needed for steam-room; and to prevent priming, and in order to give more steam-room and afford drier steam, a large dome, E, is placed directly over the fire-box, where it will receive the hottest and driest steam produced.

It will be seen that this method of arranging the return-tubes causes a great depth of water to be maintained over the crown-sheet, thus insuring much greater safety than can be had in boilers of the ordinary locomotive type, unless a large quantity of dead water is carried in order to cover the crown-sheet to the same depth.

In case the water accidentally gets below the upper tier of tubes, no damage is done, as they simply act as superheaters, and are in no way weakened by the exposure.

A water-back, F, is placed in the upper part of the returning-chamber C, into which the feed-water may be introduced before entering the boiler, thus heating it to the steam-producing point, and preventing any fall of pressure or condensation of steam, while feeding, from the introduction of comparatively cold feed-water, or water of a lower temperature than that in the boiler. This water-back F also protects the rear tube-sheet of the boiler above the water-line from the direct action of the fire, which reaches the returning-chamber with nearly its full intensity, owing to the great proportional size of the flue B, which is made thus large for the especial purpose of enlarging the combustion-chamber, thus rendering the returning-tubes d much more effective than they would be were several smaller tubes or flues used in place of the single large flue.

The returning-chamber and smoke-bonnet are both provided with large doors, which afford free access to the tubes e, thus rendering their cleaning a simple operation, as even when running the doors may be opened and the tubes brushed out without disturbing the fires or preventing the production of steam to any great extent.

In order to give free access to the fire-box and flue, the whole front G is made removable, to allow of which the grate-bars m are carried upon independent bearers g and h, the ends of which are supported by the inner shell of the fire-box.

A flange, k, upon the front G, enters the fire-box a short distance, and may be secured in position by bolts tapped into the boiler, or in any other suitable manner which will allow it to be readily removed when desired. This front is further provided with two openings, closed by the doors H and I. The door H opens into the fire-box above the grate-bars, and is that through which fuel is introduced.

The door I opens into the ash-pit, and serves the double purpose of an opening through which the ashes are removed, and as a draft-regulator for supplying the desired amount of air to the fire.

It will be observed that the whole forms a light, compact, and powerful boiler, admirably adapted to the purpose designed, as, when mounted upon wheels, the hind axle is placed near the fire-box and the forward axle under the opposite end, and as this part of the boiler is so much higher than the bottom of the fire-box, no difficulty is experienced in turning short corners, as the forward wheels readily pass under it in turning.

Having thus described our invention, we claim as new, and desire to secure by Letters Patent, the following:

1. In a steam-boiler having an internal fire-box provided with a water-bottom and a removable fire-front, the combination of said fire-box, the large flue B, and its accompanying side tubes d with a returning-chamber containing the water-back F, and with the returning-tubes e, all constructed and arranged in the manner described.

2. The returning-chamber C, in combination with the central large tube B and side tubes d and water-back F, located above and in rear of the water-line of the main boiler, and attached to the shell of the same, in the manner and for the purpose shown and described.

In testimony that we claim the foregoing as our own we hereunto affix our signatures in presence of two witnesses.

CHARLES E. BARBER.
GEORGE A. PORTER.

Witnesses:
T. R. PORTER,
D. H. GOWING.